US010954361B2

United States Patent
Langerbeins et al.

(10) Patent No.: US 10,954,361 B2
(45) Date of Patent: Mar. 23, 2021

(54) CURING AGENT FOR SILICONE RUBBER COMPOUNDS

(71) Applicant: NITROCHEMIE ASCHAU GMBH, Aschau am Inn (DE)

(72) Inventors: Klaus Langerbeins, Aschau am Inn (DE); Ulrich Pichl, Aschau am Inn (DE); Alexis Krupp, Aschau am Inn (DE); Gerhard Schmidt, Aschau am Inn (DE)

(73) Assignee: NITROCHEMIE ASCHAU GMBH, Aschau/Inn (DE)

( * ) Notice: Subject to any disclaimer, the term of this patent is extended or adjusted under 35 U.S.C. 154(b) by 0 days.

(21) Appl. No.: 16/315,350

(22) PCT Filed: Jul. 13, 2017

(86) PCT No.: PCT/EP2017/067742
§ 371 (c)(1),
(2) Date: Jan. 4, 2019

(87) PCT Pub. No.: WO2018/011361
PCT Pub. Date: Jan. 18, 2018

(65) Prior Publication Data
US 2019/0211187 A1 Jul. 11, 2019

(30) Foreign Application Priority Data
Jul. 13, 2016 (EP) ..................................... 16179306

(51) Int. Cl.
| *C08K 5/5419* | (2006.01) |
| *C07F 7/18* | (2006.01) |
| *C08L 83/04* | (2006.01) |
| *C08K 5/54* | (2006.01) |
| *C08L 15/00* | (2006.01) |
| *C08K 5/00* | (2006.01) |

(52) U.S. Cl.
CPC .......... *C08K 5/5419* (2013.01); *C07F 7/1804* (2013.01); *C07F 7/188* (2013.01); *C08K 5/5403* (2013.01); *C08L 15/00* (2013.01); *C08L 83/04* (2013.01); *C08K 5/0025* (2013.01)

(58) Field of Classification Search
None
See application file for complete search history.

(56) References Cited

U.S. PATENT DOCUMENTS

| 3,431,129 | A | | 3/1969 | Ismail et al. | |
| 3,912,493 | A | | 10/1975 | Foery et al. | |
| 4,045,459 | A | | 8/1977 | Foery et al. | |
| 4,511,728 | A | * | 4/1985 | Kreuzer | C07F 7/045 556/419 |
| 4,552,942 | A | | 11/1985 | Kreuzer et al. | |
| 4,636,573 | A | | 1/1987 | Pastor et al. | |
| 5,049,635 | A | * | 9/1991 | Inoue | C08K 5/54 528/18 |
| 6,046,156 | A | * | 4/2000 | Perry | C07F 7/1804 512/25 |
| 9,481,817 | B2 | * | 11/2016 | Pichl | B01J 31/04 |
| 2012/0016072 | A1 | | 1/2012 | Ederer et al. | |
| 2018/0016400 | A1 | * | 1/2018 | Gutacker | B65D 85/07 |
| 2019/0202844 | A1 | * | 7/2019 | Mejia | C07F 7/188 |

FOREIGN PATENT DOCUMENTS

| CH | 528209 A | | 9/1972 |
| CN | 106749381 A | * | 5/2017 |
| DE | 1288314 B | | 1/1969 |
| DE | 2239412 A1 | | 3/1973 |
| EP | 0089618 A1 | | 9/1983 |
| EP | 2030976 A1 | | 3/2009 |
| WO | WO 2014/135261 | * | 9/2014 |
| WO | 2016146685 A1 | | 9/2016 |

OTHER PUBLICATIONS

R.M. Ismail, "Silyliierung hydroxyaromatischer Verbindungen mit Si—N_Verbindungen [1]¹)²)" Helvetica Chimica Acta, vol. 47, No. 8, pp. 2405-2410, 1964, abstract.
Database Caplus Chemical Abstracts Service, Columbus, Ohio, US, 1978—Database accession No. 1978:509674 (2 pages total).
Database Caplus Chemical Abstracts Service, Columbus, Ohio, US, 1976—Database accession No. 1976:542765; ( 4 pages total).
Database Caplus Chemical Abstracts Service, Columbus, Ohio, US, 1976—Database accession No. 1976:405755; (2 pages total).
Database Caplus Chemical Abstracts Service, Columbus, Ohio, US, 1954—Database accession No. 1954:60285; (1 page total).
International Search Report dated Sep. 13, 2017, from the International Searching Authority in counterpart International Application No. PCT/EP2017/067742.

* cited by examiner

*Primary Examiner* — Marc S Zimmer
(74) *Attorney, Agent, or Firm* — Sughrue Mion, PLLC

(57) ABSTRACT

What are presented and described are a curing agent for silicone rubber compounds comprising a compound having the general structural formula $R^1_m Si(R)_{4-m}$, a process for preparation thereof and the use of this curing agent for hardening a silicone rubber compound. The invention further relates to a composition comprising the curing agent for silicone rubber compounds and to the use of such a composition as sealant, adhesive or coating composition.

31 Claims, No Drawings

CURING AGENT FOR SILICONE RUBBER COMPOUNDS

CROSS REFERENCE TO RELATED APPLICATIONS

This application is a National Stage of International Application No. PCT/EP2017/067742 filed Jul. 13, 2017, claiming priority based on German Patent Application No. 16179306.2 filed Jul. 13, 2016.

The invention relates to a curing agent for silicone rubber compounds comprising a compound having the general structural formula $R^1{}_m Si(R)_{4-m}$, to a process for preparation thereof and to the use of this curing agent for hardening a silicone rubber compound. The invention further relates to a composition comprising the curing agent for silicone rubber compounds and to the use of such a composition as sealant, adhesive, potting compound or coating composition.

Cold-curing silicone rubber compounds, also called RTV (=room-temperature-crosslinking) silicone rubber compounds, are known as tailored materials having elastic properties. They find wide use as sealants, as join material or as adhesives for glass, porcelain, ceramic, stone, plastics, metals, wood etc., particularly in the sanitary sector, in structural engineering or as coating materials. Preference is given to using cold-curing silicone rubber compounds in the form of one-component RTV silicone rubber compounds (RTV-1). Silicone rubber compounds of this kind are typically plastically deformable mixtures of polyorganosiloxanes having functional groups and suitable crosslinking agents, especially suitable curing agents, which are stored with exclusion of moisture. These mixtures crosslink under the influence of water or air humidity at room temperature. This operation is typically also referred to as curing. The curing agents used are frequently also referred to as crosslinkers.

The properties of the cured silicone rubber compounds are determined to a crucial degree by the polyorganosiloxanes used and the curing agents used. For example, depending on the use of tri- and/or tetrafunctional curing agents, it is possible to control the degree of crosslinking of the cured silicone rubber compound. The degree of crosslinking has a considerable influence on, for example, the solvent resistance of the cured silicone rubber compound. The polyorganosiloxanes used also have an influence on the degree of crosslinking, especially via the number of functional groups that they bear. However, alpha,omega-dihydroxypolyorganosiloxanes are used particularly frequently.

In the course of curing, the polyorganosiloxanes form bonds with the curing agents. In the course of curing, suitable leaving groups present on the curing agent are detached from the curing agent. The bonds to the polyorganosiloxanes are formed by the functional groups of the polyorganosiloxanes, especially via the OH groups thereof. On the basis of the leaving groups released that are borne by the curing agents, a distinction is made between acidic (acids as leaving group, for example acetic acid), basic (amines as leaving groups) and neutral (alcohols or oximes as leaving groups) curing agents or RTV-1 systems.

Because of the aggressive compounds released by the acidic and basic RTV-1 rubber compounds in the course of crosslinking, which can damage metals, stone or mortar among other materials, preference is nowadays given to using RTV-1 rubber compounds that release neutral leaving groups in the course of crosslinking, i.e. are neutrally crosslinking. Curing agents used are particularly frequently those based on alkoxysilane, having ethanol or methanol for example as leaving groups. However, RTV-1 systems with alkoxy crosslinkers frequently have problems with storage stability and with regard to the adhesion of the cured silicone rubber compound. Likewise frequently used are oxime-based curing agents, which are hydrolysed with release of an oxime, for example an alkanone oxime such as butan-2-one oxime. A disadvantage of the oxime-based curing agents is that they can have adverse toxicological properties. More particularly, butan-2-one oxime, according to comparatively recent findings, is a suspected carcinogen.

Moreover, virtually all the curing agents typically used that have been mentioned have the disadvantage that a considerable odour nuisance emanates from the corresponding RTV-1 systems in the course of curing. This odour nuisance can in some cases also entail health-related disadvantages. Particularly when the corresponding RTV-1 systems are used in closed spaces, the user is severely exposed to the sometimes malodorous leaving groups.

Also known in the prior art are curing agents that have leaving groups based on glycolic acid and lactic acid.

U.S. Pat. No. 4,552,942 describes silanes that have at least three glycolic esters or lactic esters as leaving groups on the silicon atom. These can be used in compositions comprising diorganopolysiloxanes and other substances such as catalysts.

EP 2 030 976 describes mixtures of two different silanes as curing agent for silicone rubber compounds, where the silanes each include alkyl 2-hydroxypropionate as leaving groups.

A disadvantage of the curing agents described above is that they sometimes have an unpleasant odour and that silicone rubber compounds crosslinked with the curing agents sometimes show unsatisfactory mechanical properties. Moreover, it has been found that silicone rubber compounds can have inadequate storage stability with the substances typically present therein, at elevated temperature in particular.

Furthermore, the curing agent used should lead to good mechanical properties in the silicone rubber compound after curing.

It is also desirable that the polymerization product be transparent or clear on conclusion of curing of the silicone rubber compound.

The problem addressed by the invention is thus that of providing a curing agent for silicone rubber compounds that eliminates or at least reduces at least some of the disadvantages of the curing agents known in the prior art and/or has satisfactory properties.

This problem is solved by the curing agent specified in Claim 1, 18, 19, 20, 21 and 29, the process specified in Claim 23, the use specified in Claim 30, the compositions specified in Claim 31 to 33, and the use specified in Claim 34.

Advantageous configurations of the invention are specified in the dependent claims and are elucidated in detail hereinafter.

The curing agent of the invention for silicone rubber compounds comprises a compound having the general structural formula $R^1{}_m Si(R)_{4-m}$ where each $R^1$ is independently an optionally substituted straight-chain or branched C1- to C16-alkyl group, an optionally substituted straight-chain or branched C2- to C16-alkenyl group or an optionally substituted C4- to C14-aryl group, m is an integer from 0 to 2, R is a hydroxycarboxylic ester radical having the general structural formula (I):

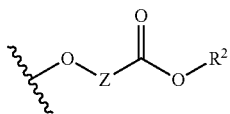
(I)

where
R² is an optionally substituted straight-chain or branched C1- to C16-alkyl group, a C4- to C14-cycloalkyl group, a C5- to C15-aralkyl group or a C4- to C14-aryl group,
Z is an optionally substituted aromatic group having 4 to 14 carbon atoms, where, when m=2, m=1 or m=0, the C6-aryl group is not

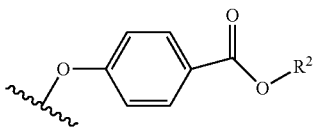

and, when m=2 or m=0 and the C6-aryl group is

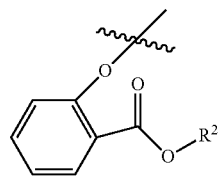

R² is not phenyl;
and, when the C6-aryl group is

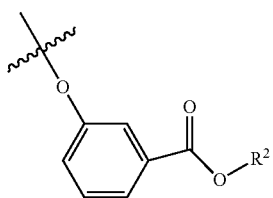

R² is not ethyl or —(CR³R⁴)$_n$—; or is an optionally substituted saturated or partly unsaturated cyclic ring system having 4 to 14 carbon atoms,
each R³ and R⁴ is independently H or an optionally substituted straight-chain or branched C1- to C16 alkyl group or a C4- to C14-aryl group, and
n is an integer from 1 to 10
or oligomers or polymers of the curing agent,
where,
when n is 1, R³ and R⁴ are not H and R³ is not H and R⁴ is not methyl and R³ is not methyl and R⁴ is not H.

It has been found that, surprisingly, the use of curing agents of the invention has the effect that silicone rubber compounds, especially sealant formulations comprising curing agents of the invention, have one or more of the following properties: colourless and transparent, good mechanical properties, especially a good skin time, freedom from tack and good breaking strength, a pleasant odour, and on storage at elevated temperature remaining stable and especially not discolouring. Without wishing to be bound to any scientific theory, the effect of the curing agents of the invention appears to arise through the specific structure of the curing agents, especially of the hydroxycarboxylic ester radicals, which seems to enable firstly stabilization of the silicone rubber compounds, especially of the sealant formulation, on storage at elevated temperature, and secondly good mechanical properties of the cured sealants.

The curing agent or crosslinker of the invention for silicone rubber compounds is capable of polymerizing or condensing in the presence of water or air humidity with di- or polyfunctional polyorganosiloxane compounds to form Si—O—Si bonds. Preference is given here to using alpha, omega-dihydroxypolyorganosiloxanes as difunctional polyorganosiloxane compounds.

It was found here that the curing agent of the invention has improved action in the curing of silicone rubber compounds, especially of sealant formulations, in the presence of water or air humidity at room temperature. More particularly, the curing agent of the invention has the advantage of releasing molecules that are of no toxicological concern on hydrolysis. Moreover, the molecules released by the curing agent on hydrolysis are also not corrosive or aggressive to materials such as metals, mortar or stone-.

"Sealants" or "sealing compounds" refer to elastic materials that are applied in liquid to viscous form or as flexible profiles or sheets for sealing of a surface, especially to water, gases or other media.

The term "adhesive" relates to substances that bind adherends via surface bonding (adhesion) and/or inner strength (cohesion). This term especially embraces glue, paste, dispersion adhesives, solvent-based adhesives, reactive adhesives and contact adhesives.

"Potting compounds" or else "cable potting compounds" in the context of the invention are compounds that are to be processed under hot or cold conditions for potting of cables and/or cable accessories.

"Curing agents" are especially understood to mean crosslinkable silane compounds that have at least two groups detachable by hydrolysis. Examples of such crosslinkable silane compounds are Si(OCH₃)₄, Si(CH₃)(OCH₃)₃ and Si(CH₃)(C₂H₅)(OCH₃)₂. Curing agents can also be referred to as crosslinkers. "Curing agents" especially also encompass "curing agent systems", which may especially contain more than one crosslinkable silane compound.

In the general structural formula (I), the hydroxycarboxylic ester radical is bonded to the silicon atom via the oxygen atom of the hydroxyl group. For example, a compound having the general structural formula R¹$_m$Si(R)$_{4-m}$ in which m is 1 which is present in the curing agent of the invention has the general structural formula (Ia):

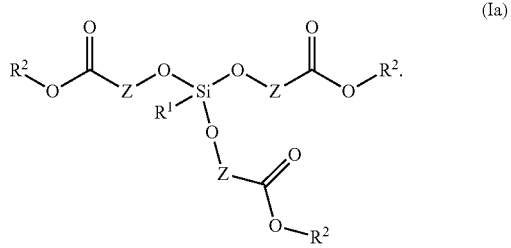
(Ia)

In addition, each $R^1$ may be different when two or more $R^1$ radicals are bonded to the silicon atom. In addition, the $R^3$ and $R^4$ radicals along the carbon chain —$(CR^3R^4)_n$— where n is an integer from 1 to 10 may independently be different from one another for each carbon atom in the chain. Oligomers and polymers of the curing agent are especially at least two monomeric compounds having the general structural formula $R^1_m Si(R)_{4-m}$ in which at least two silicon atoms in the different monomers are bonded to one another via siloxane oxygens. In accordance with the number of binding siloxane oxygens on the silicon atom, the number of R radicals is reduced.

The term "alkyl group" means a saturated hydrocarbon chain. Alkyl groups especially have the general formula —$C_n H_{2n+1}$. The term "C1- to C16-alkyl group" especially denotes a saturated hydrocarbon chain having 1 to 16 carbon atoms in the chain. Examples of C1- to C16-alkyl groups are methyl, ethyl, propyl, butyl, isopropyl, isobutyl, sec-butyl, tert-butyl, n-pentyl and ethylhexyl. Correspondingly, a "C1- to C8-alkyl group" more particularly denotes a saturated hydrocarbon chain having 1 to 8 carbon atoms in the chain. Alkyl groups may especially also be substituted, even if this is not stated specifically.

"Straight-chain alkyl groups" denote alkyl groups that do not contain any branches. Examples of straight-chain alkyl groups are methyl, ethyl, n-propyl, n-butyl, n-pentyl, n-hexyl, n-heptyl and n-octyl.

"Branched alkyl groups" denote alkyl groups that are not straight-chain, i.e. in which the hydrocarbon chain in particular has a fork. Examples of branched alkyl groups are isopropyl, isobutyl, sec-butyl, tert-butyl, sec-pentyl, 3-pentyl, 2-methylbutyl, iso-pentyl, 3-methylbut-2-yl, 2-methylbut-2-yl, neopentyl, ethylhexyl, and 2-ethylhexyl.

"Alkenyl groups" denote hydrocarbon chains that contain at least one double bond along the chain. For example, an alkenyl group having a double bond especially has the general formula —$C_n H_{2n-1}$. However, alkenyl groups may also have more than one double bond. The term "C2- to C16-alkenyl group" particularly denotes a hydrocarbon chain having 2 to 16 carbon atoms in the chain. The number of hydrogen atoms varies here depending on the number of double bonds in the alkenyl group. Examples of alkenyl groups are vinyl, allyl, 2-butenyl and 2-hexenyl.

"Straight-chain alkenyl groups" denote alkenyl groups that do not contain any branches. Examples of straight-chain alkenyl groups are vinyl, allyl, n-2-butenyl and n-2-hexenyl.

"Branched alkenyl groups" denote alkenyl groups that are not straight-chain, i.e. in which the hydrocarbon chain more particularly has a fork. Examples of branched alkenyl groups are 2-methyl-2-propenyl, 2-methyl-2-butenyl and 2-ethyl-2-pentenyl.

"Aryl groups" denote monocyclic (e.g. phenyl), bicyclic (e.g. indenyl, naphthalenyl, tetrahydronaphthyl, or tetrahydroindenyl) and tricyclic (e.g. fluorenyl, tetrahydrofluorenyl, anthracenyl, or tetrahydroanthracenyl) ring systems, in which the monocyclic ring system or at least one of the rings in a bicyclic or tricyclic ring system is aromatic. More particularly, a C4- to C14-aryl group denotes an aryl group having 4 to 14 carbon atoms. Aryl groups may especially also be substituted, even when this is not stated specifically.

An "aromatic group" denotes cyclic, planar hydrocarbons having an aromatic system. An aromatic group having 4 to 14 carbon atoms especially denotes an aromatic group containing 4 to 14 carbon atoms. The aromatic group may especially be monocyclic, bicyclic or tricyclic. An aromatic group may also contain 1 to 5 heteroatoms selected from the group consisting of N, O, and S. Examples of aromatic groups are benzene, naphthalene, anthracene, phenanthrene, furan, pyrrole, thiophene, isoxazole, pyrazine and quinoline, where the necessary number of hydrogen atoms has been removed in each of the aforementioned examples in order to enable incorporation into the corresponding structural formula. For example, in a structural formula HO—R*—$CH_3$ where R* is an aromatic group having 6 carbon atoms, especially benzene, two hydrogen atoms would be removed from the aromatic group, especially from benzene, in order to enable incorporation into the structural formula.

A "cycloalkyl group" denotes a nonaromatic hydrocarbon ring. More particularly, a cycloalkyl group having 4 to 14 carbon atoms denotes a nonaromatic hydrocarbon ring having 4 to 14 carbon atoms. Cycloalkyl groups may be saturated or partly unsaturated. Saturated cycloalkyl group are nonaromatic and also do not have any double or triple bonds. Partly unsaturated cycloalkyl groups, by contrast with saturated cycloalkyl groups, have at least one double or triple bond, but the cycloalkyl group is nonaromatic. Cycloalkyl groups may especially also be substituted, even when this is not stated specifically.

An "aralkyl group" denotes an alkyl group substituted by an aryl group. A "C5- to C15-aralkyl group" especially denotes an aralkyl group having 5 to 15 carbon atoms, including the carbon atoms both in the alkyl group and in the aryl group. Examples of aralkyl groups are benzyl and phenylethyl. Aralkyl groups may especially also be substituted, even when this is not stated specifically.

A "cyclic ring system" denotes a nonaromatic hydrocarbon ring. More particularly, a cyclic ring system having 4 to 14 carbon atoms denotes a nonaromatic hydrocarbon ring system having 4 to 14 carbon atoms. A cyclic ring system may consist of a single hydrocarbon ring (monocyclic), of two hydrocarbon rings (bicyclic) or three hydrocarbon rings (tricyclic). More particularly, cyclic ring systems may also contain 1 to 5 heteroatoms, preferably selected from the group consisting of N, O, and S.

"Saturated cyclic ring systems" are nonaromatic and also do not have any double or triple bonds. Examples of saturated cyclic ring system are cyclopentane, cyclohexane, decalin, norbornane and 4H-pyran, where the necessary number of hydrogen atoms has been removed in each of the aforementioned examples to enable incorporation into the corresponding structural formula. For example, in a structural formula HO—R*—$CH_3$ where R* is a cyclic ring system having 6 carbon atoms, especially cyclohexane, two hydrogen atoms would be removed from the cyclic ring system, especially from cyclohexane, in order to allow incorporation into the structural formula.

A "partly unsaturated cyclic ring system", by contrast with a saturated cyclic ring system, has at least one double or triple bond, but the cyclic ring system is nonaromatic. Examples of unsaturated cyclic ring systems are cyclopentene, cyclohexene, norbornene and 2H-pyran, where the necessary number of hydrogen atoms has been removed in each of the aforementioned examples to enable incorporation into the corresponding structural formula. For example, in a structural formula HO—R*—$CH_3$ where R* is a cyclic ring system having 6 carbon atoms, especially cyclohexene, two hydrogen atoms would be removed from the cyclic ring system, especially from cyclohexene, in order to allow incorporation into the structural formula.

Unless stated otherwise, N more particularly denotes nitrogen. In addition, O more particularly denotes oxygen, unless stated otherwise. S more particularly denotes sulfur, unless stated otherwise.

"Optionally substituted" means that, in the corresponding group or radical, hydrogen atoms may be replaced by substituents. Substituents may especially be selected from the group consisting of C1- to C4-alkyl, methyl, ethyl, propyl, butyl, phenyl, benzyl, halogen, fluorine, chlorine, bromine, iodine, hydroxyl, amino, alkylamino, dialkylamino, C1- to C4-alkoxy, phenoxy, benzyloxy, cyano, nitro, and thio. When a group is referred to as optionally substituted, 0 to 50, especially 0 to 20, hydrogen atoms in the group may be replaced by substituents. When a group is substituted, at least one hydrogen atom has been replaced by a substituent.

"Alkoxy" denotes an alkyl group bonded to the main carbon chain via an oxygen atom.

The curing agent of the invention contains a compound having the general structural formula $R^1_m Si(R)_{4-m}$ where m may be an integer from 0 to 2. The compound having the general structural formula $R^1_m Si(R)_{4-m}$ is especially also referred to as silane. Therefore, the curing agent may thus comprise a silane having two, three or four hydrolysable groups. Preferably, m is 0 or 1, such that the curing agent contains a silane having three or four hydrolysable groups. In this way, it is possible to control the degree of crosslinking of the curing agent and to adjust the solvent resistance and/or the mechanical properties.

In a further embodiment of the invention, in the general structural formula $R^1_m Si(R)_{4-m}$, m=2. As a result, the general structural formula has two $R^1$ radicals. The $R^1$ radicals may be the same or different. The choice of $R^1$ radicals can be used to control the rate of crosslinking.

In one embodiment of the invention n is an integer from 2 to 10, preferably from 2 to 5.

In one embodiment of the invention, each $R^1$ is independently an optionally substituted straight-chain or branched C1- to C12-alkyl group, especially an optionally substituted straight-chain or branched C1- to C8-alkyl group, or an optionally substituted straight-chain or branched C2- to C12-alkenyl group, especially an optionally substituted straight-chain or branched C2- to C8-alkenyl group or an optionally substituted C4- to C10-aryl group. More particularly, each $R^1$ may independently be methyl, ethyl, propyl, vinyl, phenyl or allyl. Each $R^1$ is more preferably independently methyl, propyl or vinyl. Practical experiments have shown that curing agents having such radicals give sealants having good mechanical properties. In addition, sealants having such radicals are usually colourless and transparent.

In a further embodiment of the invention, each $R^3$ and $R^4$ is independently H or an optionally substituted straight-chain or branched C1- to C12-alkyl group, especially an optionally substituted straight-chain or branched C1- to C8-alkyl group. More particularly, each $R^3$ and $R^4$ is independently selected from the group consisting of H, methyl, ethyl, propyl, butyl, n-butyl, sec-butyl, isobutyl and tert-butyl. The $R^3$ and $R^4$ radicals along the carbon chain —$(CR^3R^4)_n$— where n is an integer from 1 to 10, especially from 2 to 10 or from 2 to 5, may independently be different from one another for each carbon atom in the chain.

In a further embodiment of the invention, $R^2$ is an optionally substituted straight-chain or branched C1- to C12-alkyl group, especially an optionally substituted straight-chain or branched C1- to C8-alkyl group, a C4- to C10-cycloalkyl group, a C5- to C11-aralkyl group or a C4- to C10-aryl group. More particularly, $R^2$ is selected from the group consisting of methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, nonyl, decyl, undecyl, dodecyl, ethylhexyl, 2-ethylhexyl, benzyl, phenyl, naphthyl and cyclohexyl. $R^2$ is more preferably selected from the group consisting of methyl, ethyl, isopropyl, n-butyl and 2-ethylhexyl. Curing agents comprising compounds of this kind lead to sealants having good mechanical properties. Moreover, they have good compoundability. The resulting sealants are also transparent and colourless.

In a further embodiment of the invention, Z is an optionally substituted aromatic group having 4 to 14 carbon atoms, where the aromatic group is not a benzene radical. A divalent benzene radical means, as described herein, that two hydrogen atoms have been removed in a benzene ring in order to enable incorporation into the general structural formula, especially into the general structural formula (I). The same is true of the incorporation of the aromatic group into the general structural formula (I). Practical experiments have shown that curing agents comprising compounds of this kind give sealants having particularly good mechanical properties. In addition, curing agents comprising compounds of this kind have a pleasant odour since they release substances on hydrolysis that have a pleasant odour. Moreover, sealants comprising curing agents of this kind are transparent and colourless.

As well as the divalent benzene radical, Z may also denote other aromatic groups. For example, Z may denote divalent substituted benzene rings such as toluene, xylene, phenol, anisole, or chlorobenzene. In addition, Z may also denote divalent naphthalene or anthracene which may in turn optionally be substituted.

Accordingly, the hydroxycarboxylic ester radical R of the compound present in the curing agent of the invention may also derive from hydroxyalkyl naphthalenecarboxylates, especially from 3-hydroxyethyl 2-naphthalenecarboxylate.

In addition, in this embodiment, the optionally substituted aromatic group may also contain 0 to 5 heteroatoms selected from the group consisting of N, O and S. Examples of such aromatic groups are furan, pyrrole and quinoline, which may in turn optionally be substituted.

As described further up, for example, two hydrogen atoms in the aromatic group have been removed in order to enable incorporation into the general structural formula (I).

It has been found that, surprisingly, it is possible especially with the curing agents of the invention to provide silicone rubber compounds for which no organometallic catalysts, especially no organotin compounds, are required for curing thereof. This is especially true of curing agents of the invention that contain a compound having the general structural formula $R^1_m Si(R)_{4-m}$ where R has the general structural formula (I) as defined above and Z denotes an optionally substituted aromatic group having 4 to 14 carbon atoms.

In a further embodiment of the invention, the curing agent of the invention includes a compound having the general structural formula $R^1{}_m Si(R)_{4-m}$ where each $R^1$ is independently an optionally substituted straight-chain or branched C1- to C16-alkyl group, an optionally substituted straight-chain or branched C2- to C16-alkenyl group or an optionally substituted C4- to C14-aryl group,
m is an integer from 0 to 2,
R is a hydroxycarboxylic ester radical having the general structural formula (II):

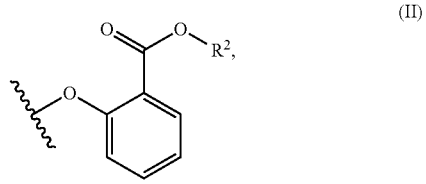

where $R^2$ is an optionally substituted straight-chain or branched C1- to C16-alkyl group, a C4- to C14-cycloalkyl group or a C5- to C15-aralkyl group
or oligomers or polymers of the curing agent. In the general structural formula (II), the hydroxycarboxylic ester radical is bonded to the silicon atom via the oxygen atom of the hydroxyl group.

In a further embodiment of the invention, $R^2$ is an optionally substituted straight-chain or branched C1- to C12-alkyl group, especially an optionally substituted straight-chain or branched C1- to C8-alkyl group, a C4- to C10-cycloalkyl group or a C5- to C11-aralkyl group. More particularly, $R^2$ is selected from the group consisting of methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, nonyl, decyl, undecyl, dodecyl, ethylhexyl, 2-ethylhexyl, benzyl, naphthyl and cyclohexyl. $R^2$ is more preferably selected from the group consisting of methyl, ethyl, isopropyl, n-butyl and 2-ethylhexyl, especially from the group consisting of ethyl and 2-ethylhexyl. Curing agents comprising compounds of this kind lead to sealants having good mechanical properties. Moreover, they have good compoundability. The resulting sealants are also transparent and colourless.

In a further embodiment of the invention, each $R^1$ is independently an optionally substituted straight-chain or branched C1- to C12-alkyl group, especially an optionally substituted straight-chain or branched C1- to C8-alkyl group, or an optionally substituted straight-chain or branched C2- to C12-alkenyl group, especially an optionally substituted straight-chain or branched C2- to C8-alkenyl group or an optionally substituted C4- to C10-aryl group. More particularly, each $R^1$ may independently be methyl, ethyl, propyl, vinyl, phenyl or allyl.

In a further embodiment of the invention, in the compound having the general structural formula $R^1{}_m Si(R)_{4-m}$, m=1, $R^1$ is vinyl and R has the general structural formula (II) described herein where $R^2$ is ethyl. This compound is especially also referred to as tris(ethylsalicylato)-vinylsilane.

In a further embodiment of the invention, in the compound having the general structural formula $R^1{}_m Si(R)_{4-m}$, m=1, $R^1$ is methyl and R has the general structural formula (II) described herein where $R^2$ is ethyl. This compound is especially also referred to as tris(ethyl-salicylato)methylsilane.

In a further embodiment of the invention, in the compound having the general structural formula $R^1{}_m Si(R)_{4-m}$, m=1, $R^1$ is propyl and R has the general structural formula (II) described herein where $R^2$ is ethyl. This compound is especially also referred to as tris(ethyl-salicylato)propylsilane.

In a further embodiment of the invention, in the compound having the general structural formula $R^1{}_m Si(R)_{4-m}$, m=1, $R^1$ is vinyl and R has the general structural formula (II) described herein where $R^2$ is 2-ethylhexyl. This compound is especially also referred to as tris(2-ethylhexylsalicylato) vinylsilane.

In a further embodiment of the invention, in the compound having the general structural formula $R^1{}_m Si(R)_{4-m}$, m=1, $R^1$ is methyl and R has the general structural formula (II) described herein where $R^2$ is 2-ethylhexyl. This compound is especially also referred to as tris(2-ethylhexylsalicylato)methylsilane.

In a further embodiment of the invention, in the compound having the general structural formula $R^1{}_m Si(R)_{4-m}$, m=1, $R^1$ is propyl and R has the general structural formula (II) described herein where $R^2$ is 2-ethylhexyl. This compound is especially also referred to as tris(2-ethylhexylsalicylato)propylsilane.

For example, a compound having the general structural formula $R^1{}_m Si(R)_{4-m}$ in which m is 1 that is present in the curing agent of the invention, in this embodiment, may have the general structural formula (IIa):

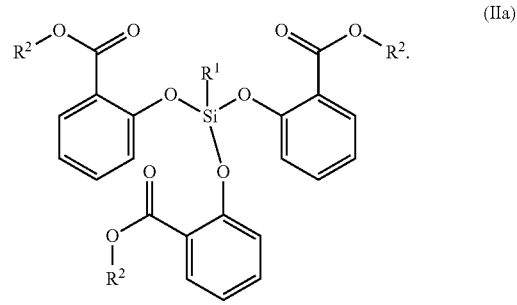

It has been found that curing agents of this kind have positive properties for sealant formulations. Firstly, curing agents of this kind release salicylic acid derivatives that are of no toxicological concern on hydrolysis. Moreover, these salicylic acid derivatives have a pleasant odour. In addition, it has been found that curing agents of this kind, when used in sealants, lead to good mechanical properties of the sealants. Moreover, sealants comprising these curing agents have a colourless and transparent appearance.

Alternatively, it has been found that compounds of the general formula $R^1{}_m Si(R)_{4-m}$ in which m is 1 that are present in the curing agent of the invention and, in this embodiment, have the general structural formula (IIb) likewise show positive properties:

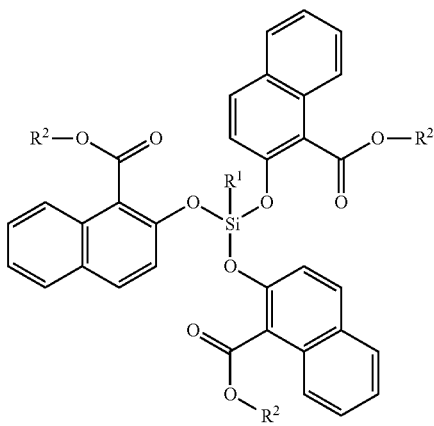

(IIb)

In this embodiment, in the general structural formula (IIb), $R^1$ is independently an optionally substituted straight-chain or branched C1- to C16-alkyl group, an optionally substituted straight-chain or branched C2- to C16-alkenyl group or an optionally substituted C4- to C14-aryl group, and $R^2$ is an optionally substituted straight-chain or branched C1- to C16-alkyl group, a C4- to C14-cycloalkyl group, a C5- to C15-aralkyl group or a C4- to C14-aryl group, or oligomers or polymers of the curing agent. More particularly, $R^2$ is selected from the group consisting of an optionally substituted straight-chain or branched C1- to C12-alkyl group, especially an optionally substituted, straight-chain or branched C1- to C8-alkyl group, a C4- to C10-cycloalkyl group, a C5- to C10-aryl group or a C5- to C11-aralkyl group. More preferably, $R^2$ is selected from the group consisting of methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, nonyl, decyl, undecyl, dodecyl, ethylhexyl, 2-ethylhexyl, benzyl, phenyl, naphthyl and cyclohexyl. Practical experiments have shown that curing agents comprising compounds of this kind can have particularly positive properties for sealant formulations, especially in relation to the mechanical properties thereof and odour thereof.

In a further embodiment of the invention, in the compound having the general structural formula $R^1{}_mSi(R)_{4-m}$, m=1, $R^1$ is methyl and R has the general structural formula (IIb) described herein where $R^2$ is ethyl. This compound is especially also referred to as tris(3-hydroxyethyl-2-naphthalenecarboxylato)methylsilane.

Practical experiments have shown that optimal results are established when the compound having the general structural formula $R^1{}_mSi(R)_{4-m}$ that is present in the curing agent of the invention is selected from the group consisting of tris(2-ethylhexylsalicylato)ethylsilane, tris(2-ethylhexylsalicylato)phenylsilane, tris(ethylhexylsalicylato)ethylsilane, tris(ethylhexyl-salicylato)methylsilane, tris(ethylhexylsalicylato)phenylsilane, tris(ethylhexylsalicylato)propylsilane, tris(ethylhexylsalicylato)vinylsilane, tris(ethylsalicylato)ethylsilane, tris(ethylsalicylato)-phenylsilane, tris(isopropylsalicylato)ethylsilane, tris(isopropylsalicylato)phenylsilane, tris-(isopropylsalicylato)propylsilane, tris(isopropylsalicylato)vinylsilane, tris(methylsalicylato)-ethylsilane, tris(methylsalicylato)methylsilane, tris(methylsalicylato)phenylsilane, tris(methyl-salicylato)vinylsilane, tetra(2-ethylhexylsalicylato)silane, tetra (ethylhexylsalicylato)silane, tetra(ethylsalicylato)silane, tetra(isopropylsalicylato)silane, tetra(methylsalicylato)silane or oligomers or polymers of the curing agent. Especially preferred compounds of the general structural formula $R^1{}_mSi(R)_{4-m}$ are selected from the group consisting of tris (ethylsalicylato)-vinylsilane, tris(ethylsalicylato)methylsilane, tris(ethylsalicylato)propylsilane, tris(2-ethylhexyl-salicylato)vinylsilane, tris(2-ethylhexylsalicylato)methylsilane and tris(2-ethylhexylsalicylato)-propylsilane. It has been found that curing agents comprising one of these preferred compounds give sealant formulations having good properties. Firstly, these sealants release salicylic acid derivatives that are of no toxicological concern and have a pleasant odour. Moreover, it is possible to obtain colourless and transparent sealants. In addition, sealant formulations with curing agents comprising one of these preferred compounds have good mechanical properties.

In a further preferred embodiment of the invention, the curing agent includes a compound having the structural formula (IIc):

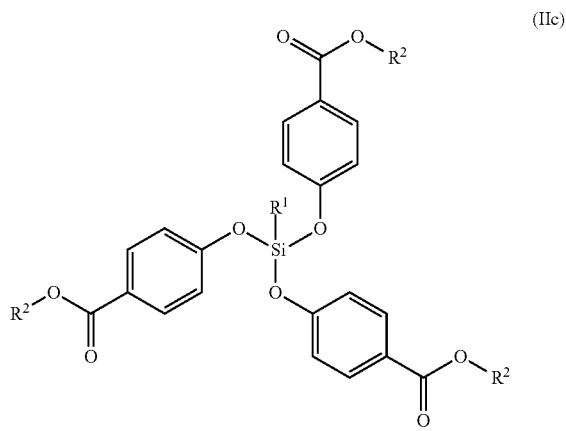

(IIc)

where R1 is vinyl and R2 is ethylhexyl.

Practical experiments have further shown that curing agents comprising a compound having the structural formula $R^1Si(R)_3$ where each R1 is independently an optionally substituted straight-chain or branched C1- to C16-alkyl group, an optionally substituted straight-chain or branched C2- to C16-alkenyl group or an optionally substituted C4- to C14-aryl group, R is a lactic acid carboxamide radical having the general structural formula (IV):

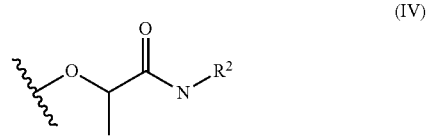

(IV)

where

R2 is an optionally substituted straight-chain or branched C1- to C16-alkyl group, or oligomers or polymers of the curing agent can have positive properties for sealant formulations, especially in relation to the mechanical properties thereof and odour thereof.

In a further embodiment of the invention, the curing agent additionally comprises a compound having the general structural formula $R^5{}_o Si(R)_{4-o}$ where $R^5$ is an optionally substituted straight-chain or branched C1- to C16-alkyl group, especially an optionally substituted straight-chain or branched C1- to C12- or a C1- to C8-alkyl group or a methyl or propyl group, or an optionally substituted straight-chain or branched C2- to C16-alkenyl group, especially an optionally substituted straight-chain or branched C2- to C12- or a C2- to C8-alkenyl group or a vinyl group or an optionally substituted C4- to C14-aryl group or a phenyl group and R is defined as described herein and o is an integer from 0 to 2 and where $R^1{}_m Si(R)_{4-m}$ and $R^5{}_o Si(R)_{4-o}$ cannot be the same.

In this embodiment, the curing agent may additionally comprise a compound having the general structural formula $R^5{}_o Si(R)_{4-o}$ where o=1, $R^5$ is a methyl group and R has the general structural formula (II) described herein where $R^2$ is ethyl. This compound is especially also referred to as tris(ethylsalicylato)methylsilane.

In addition, in this embodiment, the curing agent may additionally comprise a compound having the general structural formula $R^5{}_o Si(R)_{4-o}$ where o=1, $R^5$ is a propyl group and R has the general structural formula (II) described herein where $R^2$ is ethyl. This compound is especially also referred to as tris(ethylsalicylato)propylsilane.

In addition, in this embodiment, the curing agent may additionally comprise a compound having the general structural formula $R^5{}_o Si(R)_{4-o}$ where o=1, $R^5$ is a methyl group and R has the general structural formula (II) described herein where $R^2$ is 2-ethylhexyl. This compound is especially also referred to as tris(2-ethylhexylsalicylato)methylsilane.

In addition, in this embodiment, the curing agent may additionally comprise a compound having the general structural formula $R^5{}_o Si(R)_{4-o}$ where o=1, $R^5$ is a propyl group and R has the general structural formula (II) described herein where $R^2$ is 2-ethylhexyl. This compound is especially also referred to as tris(2-ethylhexylsalicylato)propylsilane.

By means of a curing agent of the invention comprising the two compounds $R^1{}_m Si(R)_{4-m}$ and $R^5{}_o Si(R)_{4-o}$, good adjustability of the properties of sealant formulations comprising this curing agent is possible. For example, it is advantageously possible to adjust the crosslinking rate of the sealant formulations. In addition, however, it is thus also possible to adjust the mechanical properties. This is especially true of combinations of compounds $R^1{}_m Si(R)_{4-m}$ and $R^5{}_o Si(R)_{4-o}$ where each of the compounds is selected from the group consisting of tris(ethyl-salicylato)vinylsilane, tris(ethylsalicylato)methylsilane, tris(ethylsalicylato)propylsilane, tris(2-ethylhexylsalicylato)vinylsilane, tris(2-ethylhexylsalicylato)methylsilane and tris(2-ethylhexyl-salicylato)propylsilane.

The curing agent of the invention may, as well as the two compounds $R^1{}_m Si(R)_{4-m}$ and $R^5{}_o Si(R)_{4-o}$, also contain further compounds, for example one, two or three compounds, having the general structural formula $R^{KW}{}_p Si(R)_{4-p}$ where each $R^{KW}$ is independently an optionally substituted straight-chain or branched C1- to C16-alkyl group, especially an optionally substituted straight-chain or branched C1- to C12- or a C1- to C8-alkyl group or a methyl or propyl group, or an optionally substituted straight-chain or branched C2- to C16-alkenyl group, especially an optionally substituted straight-chain or branched C2- to C12- or a C2- to C8-alkenyl group or a vinyl group or an optionally substituted C4- to C14-aryl group or a phenyl group, and R is defined as described herein and p is an integer from 0 to 2.

In a further embodiment, the curing agent of the invention comprises at least one compound selected from the group consisting of tris(ethylsalicylato)vinylsilane, tris(ethylsalicylato)-methylsilane, tris(ethylsalicylato)propylsilane, tris(2-ethylhexylsalicylato)vinylsilane, tris(2-ethylhexylsalicylato)methylsilane, tris(2-ethylhexylsalicylato)propylsilane and mixtures thereof, or the curing agent of the invention consists thereof.

The present invention further provides a curing agent obtainable by mixing at least one compound having the general structural formula $R^1{}_m Si(R)_{4-m}$ with a compound having the general structural formula $R^5{}_o Si(R)_{4-o}$, where each $R^1$ and each $R^5$ is independently defined as described herein and each R is independently defined as described herein and m and o are independently an integer from 0 to 2. For example, in curing agents comprising mixtures of different compounds $R^1{}_m Si(R)_{4-m}$ and $R^5{}_o Si(R)_{4-o}$, there can be exchange reactions between the different R groups of the different compounds. These exchange reactions can especially proceed up to a state of equilibrium. This process can also be referred to as equilibration.

For example, in a mixture of tris(2-ethylhexylsalicylato)methylsilane and tris(ethylsalicylato)-propylsilane, there can be exchange of the 2-ethylhexyl salicylate and the ethyl salicylate groups of the two silane compounds. This can especially give rise to curing agents that comprise or consist of, for example, tris(2-ethylhexylsalicylato)methylsilane, bis(2-ethylhexyl-salicylato)(ethylsalicylato)methylsilane, bis(ethylsalicylato)(2-ethylhexylsalicylato)methylsilane, tris(ethylsalicylato)methylsilane, tris(ethylsalicylato)propylsilane, bis(ethylsalicylato)(2-ethylhexylsalicylato) propylsilane, bis(2-ethylhexylsalicylato) (ethylsalicylato) propylsilane and/or tris(2-ethylhexylsalicylato) propylsilane.

The above-described exchange reactions, especially the equilibration, may especially also take place with suitable $R^{Au}$ groups in other silanes present in a silicone rubber composition. $R^{Au}$ groups suitable for exchange reactions are, for example, alkoxy, carboxylate and oxime groups, to name just a few. Accordingly, especially the $R^{Au}$ groups of silanes of the $(R^{In})_z Si(R^{Au})_{4-z}$ type can enter into exchange reactions with the R groups of the compounds having the general structural formula $R^1{}_m Si(R)_{4-m}$ and/or $R^5{}_o Si(R)_{4-o}$ that are present in the curing agent of the invention, where the $R^{In}$ groups cannot enter into any exchange reactions and z is an integer from 0 to 3. If, for example, a silicone rubber composition includes triethoxymethylsilane and tris(ethylsalicylato)propylsilane, the epoxy groups can be exchanged with the ethylsalicylato groups. As a result of this exchange reaction, the silicone rubber composition may especially include the compounds triethoxymethylsilane, diethoxy(ethylsalicylato)methylsilane, ethoxybis(ethylsalicylato)methylsilane, tris(ethyl-salicylato)methylsilane, tris(ethylsalicylato) propylsilane, ethoxybis(ethylsalicylato)propylsilane, diethoxy(ethylsalicylato)propylsilane and/or triethoxypropylsilane. Accordingly, the exchange reactions can result in distribution of the various suitable $R^{Au}$ and R groups between the corresponding silane compounds present in a silicone rubber composition, and a state of equilibrium in particular can be established.

The invention further provides processes for producing the curing agents of the invention.

The process of the invention comprises the reacting of a compound having the general formula $R^1{}_m SiX_{4-m}$ with (4−m) equivalents of at least one hydroxycarboxylic ester having the general structural formula (III)

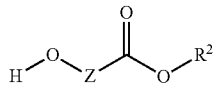
(III)

where
each $R^1$ is independently an optionally substituted straight-chain or branched C1- to C16-alkyl group or an optionally substituted straight-chain or branched C2- to C16-alkenyl group or an optionally substituted C4- to C14-aryl group,
m is an integer from 0 to 2,
X is selected from the group consisting of an alkoxy radical having at least one carbon atom and one halogen atom, especially a chlorine atom,
$R^2$ is an optionally substituted straight-chain or branched C1- to C16-alkyl group, a C4- to C14-cycloalkyl group, a C5- to C15-aralkyl group or a C4- to C14-aryl group,
Z is an optionally substituted aromatic group having 4 to 14 carbon atoms or —$(CR^3R^4)_n$— or a saturated or partly unsaturated cyclic ring system having 4 to 14 carbon atoms,
each $R^3$ and $R^4$ is independently H or an optionally substituted straight-chain or branched C1- to C16 alkyl group or a C4- to C14-aryl group, and
n is an integer from 1 to 10,
where,
when n is 1, $R^3$ and $R^4$ are not H and $R^3$ is not H and $R^4$ is not methyl and $R^3$ is not methyl and $R^4$ is not H.

In one embodiment of the process of the invention, n is an integer from 2 to 10, preferably from 2 to 5.

The X group in the process of the invention may be an alkoxy radical having at least one carbon atom. More particularly, the X group may be an alkoxy radical having 1 to 4 carbon atoms, for example —$OCH_3$, —$OC_2H_5$, —$OC_3H_7$ or —$OC_4H_9$. The $R^3$ and $R^4$ radicals along the carbon chain —$(CR^3R^4)_n$— where n is an integer from 1 to 10, especially from 2 to 10 or from 2 to 5, may be different from one another for each carbon atom in the chain.

In the process of the invention, the compound having the general formula $R^1_mSiX_{4-m}$ can be reacted with (4−m) equivalents of a single type of hydroxycarboxylic ester or the compound can be reacted with a mixture of different kinds of hydroxycarboxylic esters, where the mixture of the hydroxycarboxylic esters adds up to a total of (4−m) equivalents. The use of a single type of hydroxycarboxylic ester in the preparation process affords pure compounds; the use of a mixture of different types of hydroxycarboxylic esters affords mixed curing agents.

In a further embodiment of the process of the invention, each $R^1$ is independently an optionally substituted straight-chain or branched C1- to C12-alkyl group, especially an optionally substituted straight-chain or branched C1- to C8-alkyl group, or an optionally substituted straight-chain or branched C2- to C12-alkenyl group, especially an optionally substituted straight-chain or branched C1- to C8-alkenyl group, or an optionally substituted C4- to C10-aryl group.

In a further embodiment of the process of the invention, each $R^3$ and $R^4$ is independently H or an optionally substituted straight-chain or branched C1- to C12-alkyl group, especially an optionally substituted straight-chain or branched C1- to C8-alkyl group. The $R^3$ and $R^4$ radicals along the carbon chain —$(CR^3R^4)_n$— where n is an integer from 1 to 10, especially from 2 to 10 or from 2 to 5, may be different from one another for each carbon atom in the chain.

In a further embodiment of the process of the invention, $R^2$ is an optionally substituted straight-chain or branched C1- to C12-alkyl group, especially an optionally substituted straight-chain or branched C1- to C8-alkyl group, a C4- to C10-cycloalkyl group, a C5- to C11-aralkyl group or a C4- to C10-aryl group.

In a further embodiment of the process of the invention, each $R^1$ is independently methyl, ethyl, propyl, vinyl, phenyl or allyl. In addition, the same as stated above with regard to the hydroxycarboxylic ester radical R is applicable to the hydroxycarboxylic ester in the process of the invention.

In addition, it is possible, in the process of the invention, to use different compounds having the general formula $R^1_mSiX_{4-m}$ which especially differ by different $R^1$ radicals. For example, the two compounds $CH_3SiCl_3$ and $(C_3H_7)SiCl_3$ may be used simultaneously in the process of the invention. These may also be reacted with different hydroxycarboxylic esters. As a result, it is especially possible to directly obtain curing agent systems comprising or consisting of different crosslinkable silane compounds.

In a further embodiment of the process of the invention, Z is an optionally substituted aromatic group having 6 carbon atoms, especially a divalent benzene radical.

In a further embodiment of the process of the invention, the reaction of the compound having the general formula $R^1SiX_{4-m}$ with (4−m) equivalents of at least one hydroxycarboxylic ester is conducted at a temperature below 60° C., preferably below 50° C., further preferably below 40° C. and more preferably below 30° C.

The invention further relates to a curing agent obtainable by the process of the invention.

In a preferred embodiment, the invention relates to curing agents obtainable by the process of the invention where, when Z is a benzene ring, Z is a hydroxycarboxylic ester radical having the general structural formula (II) and $R^2$ is not a C4- to C14-aryl group.

The invention further relates to the use of a curing agent of the invention for curing a silicone rubber compound. For this purpose, in the context of this invention, a composition comprising the curing agent of the invention and a suitable silicone rubber compound is produced.

Correspondingly, a composition of the invention comprises the above-described curing agent of the invention and at least one organosilicon compound, preferably the above-described curing agent and two, three or more different organosilicon compounds. An organosilicon compound present in the composition is preferably an oligomeric or polymeric compound.

The polymeric organosilicon compound is preferably a difunctional polyorganosiloxane compound, more preferably an alpha,omega-dihydroxyl-terminated polyorganosiloxane. Very particular preference is given to alpha,omega-dihydroxyl-terminated polydiorganosiloxanes, especially alpha,omega-dihydroxyl-terminated polydialkylsiloxanes, alpha,omega-dihydroxyl-terminated polydialkenylsiloxanes or alpha,omega-dihydroxyl-terminated polydiarylsiloxanes. As well as homopolymeric alpha,omega-dihydroxyl-terminated polydiorganosiloxanes, it is also possible to use heteropolymeric alpha,omega-dihydroxyl-terminated polydiorganosiloxanes having different organic substituents, including both copolymers of monomers having identical organic substituents on one silicon atom and copolymers of monomers having different organic substituents on one silicon atom, for example those with mixed alkyl, alkenyl and/or aryl substituents.

The preferred organic substituents include straight-chain and branched alkyl groups having 1 to 8 carbon atoms, especially methyl, ethyl, n- and isopropyl, and n-, sec- and tert-butyl, vinyl and phenyl. Individual or all carbon-bonded hydrogen atoms in the individual organic substituents may be substituted here by customary substituents, such as halogen atoms or functional groups such as hydroxyl and/or amino groups. For instance, it is possible to use alpha,omega-dihydroxyl-terminated polydiorganosiloxanes having part-fluorinated or perfluorinated organic substituents or alpha,omega-dihydroxyl-terminated polydiorganosiloxanes having organic substituents substituted by hydroxyl and/or amino groups on the silicon atoms.

Particularly preferred examples of an organosilicon compound are alpha,omega-dihydroxyl-terminated polydialkylsiloxanes, for example alpha,omega-dihydroxyl-terminated polydimethylsiloxanes, alpha,omega-dihydroxyl-terminated polydiethylsiloxanes or alpha,omega-dihydroxyl-terminated polydivinylsiloxanes, and alpha,omega-dihydroxyl-terminated polydiarylsiloxanes, for example alpha,omega-dihydroxyl-terminated polydiphenylsiloxanes. Preference is given here to polyorganosiloxanes that have a kinematic viscosity of 5000 to 120 000 cSt (at 25° C.), especially those having a viscosity of 20 000 to 100 000 cSt, and more preferably those having a viscosity of 40 000 to 90 000 cSt. It is also possible to use mixtures of polydiorganosiloxanes having different viscosities.

If desired, the composition of the invention may comprise further customary additives. Customary additives are fillers, colorants, plasticizers, thixotropic agents, wetting agents, bonding agents, catalysts, inter alia.

It has been found that, surprisingly, the use of aminopropyltriethoxysilane (AMEO) as thixotropic agent leads to particularly stable sealants having outstanding mechanical properties and excellent stability. The invention therefore also provides for the use of AMEO as thixotropic agent in the production of silicone rubber compounds, especially for the provision of sealing compounds.

Fillers used may be either reinforcing or non-reinforcing fillers. Preference is given to using inorganic fillers, for example finely divided, fumed or precipitated silicas, carbon black, quartz powder, chalk, or metal salts or metal oxides, for example titanium oxides. A particularly preferred filler is a finely divided silica as obtainable, for example, under the Cabosil 150 name from Cabot. Fillers such as finely divided silicas, especially fumed silicas, can also be used as thixotropic agents. Metal oxides can also be used as colorants, for example titanium oxides as white colorants. The fillers can also be surface-modified by customary methods; for example, it is possible to use silicas hydrophobized with silanes.

Plasticizers used may be polydiorganosiloxanes known per se that lack functional end groups and hence differ from the organosilicon compounds used in accordance with the invention, and/or liquid aliphatic or aromatic hydrocarbons, preferably those having molecular weights of about 50 to about 5000, which have low volatility and sufficient compatibility with polysiloxanes. Plasticizers preferably have a kinematic viscosity of 1 to 5000 cSt (at 25° C.), especially of 50 to 500 cSt, and more preferably of 90 to 200 cSt. Examples of plasticizers include polydimethylsiloxanes having a viscosity of 90 to 120 cSt, especially of 100 cSt, paraffin oils and polysubstituted alkylbenzenes.

Wetting and/or bonding agents (adhesion promoters) used may be silane compounds that are known per se and have organic substituents on the silicon atom, which differ from the organosilicon compounds used in accordance with the invention. For example, it is possible to use organosilanes having reactive amine, carboxylic acid, epoxy or thiol groups. Specific examples of bonding agents (adhesion promoters) having reactive amine, carboxylic acid or thiol groups include aminosilanes such as aminoethyl(aminopropyl)trialkoxysilane. Specific examples of such bonding agents (adhesion promoters) are 3-aminopropyltriethoxysilane, 3-aminopropyltrimethoxysilane, aminoethylaminopropyltrimethoxysilane, butylaminopropyltri-ethoxysilane, butylaminopropyltrimethoxysilane, propylaminopropyltriethoxysilane, propylaminopropyltrimethoxysilane, N-cyclohexyl-3-aminopropyltrimethoxysilane, N-cyclohexyl-3-aminopropyltriethoxysilane, and what is called co-oligomeric diamino/alkyl functional silane, available as Dynasylan 1146 from Evonik.

Bonding agents (adhesion promoters) used may likewise be the silane compounds having other functional groups which follow. For example, it is possible to use organosilanes having tertiary amines, urea, amide, carbamate or isocyanurate groups. Specific examples of such bonding agents (adhesion promoters) are N,N'-bis(triethoxysilylpropyl)urea, tris-(triethoxysilylpropyl)diethylenetriurea, dimethylaminopropyltrimethoxysilane, 1,3,5-tris-(trimethoxysilylpropyl) isocyanurate, N-methyl(3-trimethoxysilyl)propyl carbamate and N-ethyl(3-triethoxysilyl)propyl carbamate. In particular, it is also possible to use mixtures of these substances as bonding agents (adhesion promoters).

In addition, it is possible to use organometallic catalysts as typically used for condensation-crosslinking polysiloxanes. Examples of catalysts are organotin compounds, for example dibutyltin dilaurate, dibutyltin diacetate and tin(II) octoate. Particularly suitable catalysts have been found to be alkyltin carboxylates, for example dibutyltin dilaurate, dibutyltin divalerate, dibutyltin diacetate, dibutyltin dineodecanoate, dibutyltin diacetylacetonate, dioctyltin bis(2-ethylhexanoate), dibutyltin dimaleate and butyltin tris(2-ethylhexanoate). Titanium-, zirconium- or aluminium-based compounds may likewise be used as catalysts.

It has been found that the composition can be stored with exclusion of moisture over periods of time of up to more than 12 months and polymerized under the influence of water or air humidity at room temperature.

In addition, it is advantageous that the composition of the invention, on curing, releases mainly hydroxycarboxylic esters, for example ethyl salicylate, which, by contrast with oxime compounds, for example butan-2-one oxime, are not a matter of concern with respect to health, are neither corrosive nor aggressive toward materials such as metals, mortar or stone (marble etc.) and have a pleasant odour. The cured composition is free of specks, transparent and clear.

The composition of the invention may comprise 30% to 80% by weight, preferably 35% to 70% by weight, further preferably 40% to 60% by weight, of the organosilicon compound, based in each case on the total weight of the composition of the invention.

The composition of the invention may further comprise 10% to 50% by weight, preferably 20% to 40% by weight, of plasticizers, based in each case on the total weight of the composition of the invention.

In addition, the composition of the invention may comprise 1% to 15% by weight, preferably 2% to 14% by weight, further preferably 3% to 13% by weight, of the curing agent of the invention, based in each case on the total weight of the composition of the invention. In this case, the curing agent of the invention may especially comprise or consist of the two compounds $R^1{}_m\text{Si}(R)_{4-m}$ and $R^5{}_o\text{Si}(R)_{4-o}$ described herein. In the curing agent of the invention in the composition of the invention, the compound $R^1{}_m\text{Si}(R)_{4-m}$ may especially be selected from the group consisting of tris(ethylsalicylato)vinylsilane, tris(ethylsalicylato)methylsilane, tris(ethylsalicylato)propylsilane, tris(2-ethylhexylsalicylato)vinylsilane, tris(2-ethylhexyl-salicylato)methylsilane and tris(2-ethylhexylsalicylato)propylsilane. The compound $R^5{}_o\text{Si}(R)_4$-o may especially be selected from the group consisting of tris(ethylsalicylato)methylsilane, tris-(ethylsalicylato)propylsilane, tris(2-ethylhexylsalicylato)methylsilane and tris(2-ethylhexyl-salicylato)propylsilane.

If the curing agent of the invention in the composition of the invention consists of the two compounds $R^1{}_m\text{Si}(R)_{4-m}$ and $R^5{}_o\text{Si}(R)_{4-o}$, the curing agent preferably consists to an extent of 5% to 70% by weight, further preferably to an extent of 10% to 60% by weight, more preferably to an extent of 10% to 55% by weight, based in each case on the curing agent of the invention, of the compound $R^1{}_m\text{Si}(R)_{4-m}$, and preferably to an extent of 30% to 95% by weight, further preferably 40% to 90% by weight, more preferably to an extent of 45% to 90% by weight, based in each case on the total weight of the curing agent of the invention, of the compound $R^5{}_o\text{Si}(R)_{4-o}$. In one embodiment of the invention, the curing agent of the invention in the composition of the invention consists to an extent of 50% by weight of the compound $R^1{}_m\text{Si}(R)_{4-m}$ and to an extent of 50% by weight of the compound $R^5{}_o\text{Si}(R)_{4-o}$, based in each case on the total weight of the curing agent of the invention.

However, the curing agent of the invention may also consist solely of the compound $R^1{}_m\text{Si}(R)_{4-m}$. In this case, the curing agent of the invention consists to an extent of 100% by weight of the compound $R^1{}_m\text{Si}(R)_{4-m}$, based on the total weight of the curing agent of the invention. Accordingly, the curing agent of the invention in the composition of the invention may consist to an extent of 100% by weight of the compound $R^1{}_m\text{Si}(R)_{4-m}$, based on the total weight of the curing agent of the invention.

The composition of the invention may further preferably comprise 1% to 20% by weight, further preferably 3% to 17% by weight, more preferably 4% to 15% by weight, of filler, based in each case on the total weight of the composition of the invention.

In addition, the composition of the invention may preferably comprise 0.001% to 2% by weight, further preferably 0.005% to 1% by weight, more preferably 0.01% to 1% by weight, of catalyst, based in each case on the total weight of the composition of the invention. In a further embodiment, the composition may be essentially free of catalysts, especially of organometallic catalysts such as organotin compounds.

The composition of the invention may preferably comprise 0.1% to 5% by weight, further preferably 0.5% to 4% by weight, more preferably 1% to 3% by weight, of bonding agents (adhesion promoters), based in each case on the total weight of the composition of the invention.

The invention further provides a composition obtainable by mixing at least one curing agent of the invention comprising a compound having the general structural formula $R^1{}_m\text{Si}(R)_{4-m}$ where each $R^1$ and each R is independently defined as described herein and m is an integer from 0 to 2 with at least one bonding agent (adhesion promoter) and at least one further component selected from the group consisting of thixotropic agent, organosilicon compound, filler, colorant, plasticizer, wetting agent and catalyst. The bonding agent (adhesion promoter), thixotropic agent, organosilicon compound, filler, colorant, plasticizer, wetting agent and catalyst constituents here are described herein. In mixtures of this kind, the exchange reactions described herein, especially as above for mixtures of compounds having the general structural formula $R^1{}_m\text{Si}(R)_{4-m}$ with a compound having the general structural formula $R^5{}_o\text{Si}(R)_{4-o}$ and/or with silanes having suitable $R^{4u}$ groups, can take place analogously. This is the case especially when the corresponding constituents, for example bonding agent (adhesion promoter) or thixotropic agent, are silanes of the above-described $(R^{In})_z\text{Si}(R^{4u})_{4-z}$ type with suitable $R^{4u}$ groups.

The invention likewise provides for a use of the composition of the invention as sealant, adhesive, potting compound or coating composition. The composition is preferably used in construction as sealant, as an adhesive or as a potting compound, especially in joins in structural and civil engineering, glass and window construction (preferred), and in the sanitary sector. There are further uses in mechanical engineering, for example in the automotive industry (preferred), the electrical industry, the textile industry or in industrial plant construction.

The invention is illustrated hereinafter using specific, nonlimiting examples.

EXAMPLES

Syntheses of the Curing Agents

Example 1

Synthesis of tris(ethylsalicylato)methylsilane (M(ES)3)

In a 4 l four-neck flask with precision glass stirrer, reflux condenser, dropping funnel and temperature sensor, under a nitrogen atmosphere, 604.20 g (534.69 ml; 3.64 mol) of ethyl salicylate (ES), and 382.50 g (523.97 ml; 3.78 mol) of triethylamine (TEA) are dissolved in 1920 g (2206.90 ml; 20.84 mol) of toluene. 179.40 g (141.26 ml; 1.20 mol) of methyltrichlorosilane (MTS) are metered in via dropping funnel at room temperature while stirring in such a way that the temperature of the reaction mixture always remains below 30° C. On completion of addition, the reaction mixture is stirred at room temperature and under a nitrogen atmosphere for 3 hours. The precipitate formed is filtered off under inert conditions and the filtercake is washed three times with 165 g each time (total of 570 ml; 5.43 mol) of toluene. Ten drops of cyclohexylamine are added to the filtrate, and it is subsequently freed of the solvent under reduced pressure. In this way, 629.1 g (1.16 mol), corresponding to a yield of 97% (based on methyltrichlorosilane), of the desired tris(ethylsalicylato)methylsilane product (M(ES)3) with a Cl⁻ content of 20 ppm are obtained.

Example 2

Synthesis of tris(ethylsalicylato)propylsilane (P(ES)3)

In a 4 l four-neck flask with precision glass stirrer, reflux condenser, dropping funnel and temperature sensor, under a nitrogen atmosphere, 604.20 g (534.69 ml; 3.64 mol) of ethyl salicylate (ES), and 382.50 g (523.97 ml; 3.78 mol) of triethylamine (TEA) are dissolved in 1920 g (2206.90 ml; 20.84 mol) of toluene. 213.04 g (179.78 ml; 1.20 mol) of propyltrichlorosilane (PTS) are metered in via dropping funnel at room temperature while stirring in such a way that the temperature of the reaction mixture always remains below 30° C. On completion of addition, the reaction mixture is stirred at room temperature and under a nitrogen atmosphere for 3 hours. The precipitate formed is filtered off under inert conditions and the filtercake is washed three times with 165 g each time (total of 570 ml; 5.43 mol) of toluene. Ten drops of cyclohexylamine are added to the filtrate, and it is subsequently freed of the solvent under reduced pressure. In this way, 652.1 g (1.15 mol), corresponding to a yield of 96% (based on propyltrichlorosilane), of the desired tris(ethylsalicylato)propylsilane product (P(ES)3) with a Cl$^-$ content of 20 ppm are obtained.

Example 3

Synthesis of tris(ethylsalicylato)vinylsilane (V(ES)3)

In a 4 l four-neck flask with precision glass stirrer, reflux condenser, dropping funnel and temperature sensor, under a nitrogen atmosphere, 604.20 g (534.69 ml; 3.64 mol) of ethyl salicylate (ES), and 382.50 g (523.97 ml; 3.78 mol) of triethylamine (TEA) are dissolved in 1920 g (2206.90 ml; 20.84 mol) of toluene. 193.79 g (152.59 ml; 1.20 mol) of vinyltrichlorosilane (VTS) are metered in via dropping funnel at room temperature while stirring in such a way that the temperature of the reaction mixture always remains below 30° C. On completion of addition, the reaction mixture is stirred at room temperature and under a nitrogen atmosphere for 3 hours. The precipitate formed is filtered off under inert conditions and the filtercake is washed three times with 165 g each time (total of 570 ml; 5.43 mol) of toluene. Ten drops of cyclohexylamine are added to the filtrate, and it is subsequently freed of the solvent under reduced pressure. In this way, 627.72 g (1.14 mol), corresponding to a yield of 95% (based on vinyltrichlorosilane) of the desired tris(ethylsalicylato)vinylsilane product (V(ES)3) with a Cl$^-$ content of 21 ppm are obtained.

In an analogous manner, further silanes with hydroxycarboxylic esters as leaving groups were prepared using the corresponding reactants, for example 2-ethylhexyl salicylate.

Silicone Rubber Mixtures (Sealant Formulations)

In addition, silicone rubber mixtures (sealant formulations) comprising curing agents of the invention were examined.

The product properties of skin time, tack-free time, through-curing and elongation at break of the silicone rubber mixtures (sealant formulations) were determined after deployment of the sealants by customary methods. Unless stated otherwise, the measurements were conducted at 23° C. and 50% air humidity.

The skin time indicates the time at which, after deployment of the sealant on the surface of a sample strand, a complete layer of solidified material (skin) has been observed. The tack-free time indicates the time at which the surface of a sample strand is no longer tacky. For the determination of complete curing, the sealant is applied to a glass plate with a height of 9 mm and the duration of through-curing down to the glass plate is measured. Elongation at break was determined to DIN EN ISO 8339:2005-09.

Example 4

Sealant Formulation A

In the case of sealant formulations A, B and C, silicone rubber mixtures were produced in each case according to the following formulation:

| | |
|---|---|
| 580 g | alpha,omega-dihydroxyl-terminated polydimethylsiloxane having viscosity of 80 000 cSt |
| 260 g | polydimethylsiloxane having viscosity of 100 cSt |
| 1 g | aminoalkyltrialkoxysilane |
| 91 g | untreated fumed silica |
| 0.2 g | catalyst: alkyltin carboxylate |
| 9 g | adhesion promoter: aminoalkyltrialkoxysilane |

Curing agent A was added:

| | |
|---|---|
| 56 g | P(ES)3-tris(ethylsalicylato)propylsilane |

The resulting sealant, after deployment under air, has
a skin time of 2 min
a tack-free time of 15 min
a transparent appearance
a Shore A hardness of 24

Sealant Formulation B

Curing agent B was added:

| | |
|---|---|
| 56 g | P(SEHE)3-tris(2-ethylhexylsalicylato)propylsilane |

The resulting sealant, after deployment under air, has
a skin time of 2 min
a tack-free time of 29 min
a transparent appearance
a Shore A hardness of 16

Example 4 (Prior Art; cf. EP2030976 A1, Example 7)

Sealant Formulation C with Lactate Curing Agent Mixture

As curing agent C, a mixture of the following formulation was added:

| | |
|---|---|
| 20 g | vinyltris(ethyllactato)silane |
| 20 g | methyltris(ethyllactato)silane |

The resulting sealant, after deployment under air, has
a skin time of 12 min
a tack-free time of 60 min
a transparent appearance
a Shore A hardness of 22

Example 5

A silicone rubber mixture of the following composition was produced by mixing the components under reduced pressure:

| | |
|---|---|
| 580 g | alpha,omega-dihydroxyl-terminated polydimethylsiloxane having viscosity of 80 000 cSt |
| 264 g | polydimethylsiloxane having viscosity of 100 cSt |
| 56 g | curing agent: P(ES)3 |
| 1 g | aminoalkyltrialkoxysilane |
| 91 g | untreated fumed silica |
| 0.2 g | catalyst: alkyltin carboxylate |
| 9 g | adhesion promoter: dimethylaminopropyltrimethoxysilane |

The resulting sealant was transparent and colourless and had a skin time of 3 minutes, a tack-free time of 18 minutes and complete through-curing to glass (sealant applied in thickness of 9 mm to a glass plate) after 7 days. In addition, the sealant had a pleasant odour and good adhesion to glass, aluminium, PVC, sheet metal, steel, lacquered wood, varnished wood, polyamide and Al/Mg alloy. Even after the sealant had been stored at 60° C. for 4 weeks, the sealant was stable and colourless.

Example 6

A silicone rubber mixture of the following composition was produced by mixing the components under reduced pressure:

| | |
|---|---|
| 550 g | alpha,omega-dihydroxyl-terminated polydimethylsiloxane having viscosity of 80 000 cSt |
| 264 g | polydimethylsiloxane having viscosity of 100 cSt |
| 81 g | curing agent: P(SEHE)3 |
| 1 g | aminoalkyltrialkoxysilane |
| 91 g | untreated fumed silica |
| 0.2 g | catalyst: alkyltin carboxylate |
| 9 g | adhesion promoter: dimethylaminopropyltrimethoxysilane |

The resulting sealant was transparent and colourless and had a skin time of 8 minutes, a tack-free time of 17 minutes and complete through-curing to glass (sealant applied in thickness of 9 mm to a glass plate) after 7 days. In addition, the sealant had a pleasant odour and good adhesion to glass, aluminium, PVC, sheet metal, steel, wood, lacquered wood, varnished wood, polyamide and Al/Mg alloy. Even after the sealant had been stored at 60° C. for 4 weeks, the sealant was stable and colourless.

Example 7

A silicone rubber mixture of the following composition was produced by mixing the components under reduced pressure:

| | |
|---|---|
| 504 g | alpha,omega-dihydroxyl-terminated polydimethylsiloxane having viscosity of 80 000 cSt |
| 328 g | polydimethylsiloxane having viscosity of 100 cSt |
| 65 g | curing agent: P(ES)3 |
| 1 g | aminoalkyltrialkoxysilane |
| 85 g | untreated fumed silica |
| 1 g | catalyst: 1:1 (w/w) mixture of dialkyltin oxide and tetraalkoxysilane |
| 16 g | adhesion promoter: 1:1 (w/w) mixture of dialkylaminoalkyltrialkoxysilane and tris(trialkoxysilylalkyl) isocyanurate |

The resulting sealant was transparent and colourless and had a skin time of 13 minutes, a tack-free time of 32 minutes and complete through-curing to glass (sealant applied in thickness of 9 mm to a glass plate) after 6 days. Elongation at break was determined as 340%. In addition, the sealant had a pleasant odour and good adhesion to glass, aluminium, PVC, sheet metal, steel and wood. Even after the sealant had been stored at 60° C. for 4 weeks, the sealant was stable and colourless.

Thus, the curing agent of the invention leads to sealants having good properties. More particularly, the curing agent leads to a sealant which does not cause any odour nuisance on deployment, has good elongation at break and, even in the course of prolonged storage at elevated temperature, remains stable and does not become discoloured.

Example 8 (Curing Agent Comprising a Mixture of Silanes)

A silicone rubber mixture of the following composition was produced by mixing the components under reduced pressure:

| | |
|---|---|
| 550 g | alpha,omega-dihydroxyl-terminated polydimethylsiloxane having viscosity of 80 000 cSt |
| 268 g | polydimethylsiloxane having viscosity of 100 cSt |
| 40 g | curing agent 1: tris(2-ethylhexylsalicylato)methylsilane |
| 40 g | curing agent 2: tris(2-ethylhexylsalicylato)propylsilane |
| 1 g | aminoalkyltrialkoxysilane |
| 85 g | untreated fumed silica |
| 0.7 g | catalyst: 1:1 (w/w) mixture of dialkyltin oxide and tetraalkoxysilane |
| 16 g | adhesion promoter: 1:3 (w/w) mixture of dialkylaminoalkyltrialkoxysilane and tris(trialkoxysilylalkyl)dialkylenediurea |

The resulting sealant was transparent and colourless and had a skin time of 15 minutes, a tack-free time of 60 minutes and complete through-curing to glass (sealant applied in thickness of 9 mm to a glass plate) after 6 days. Elongation at break was determined as 370%. In addition, the sealant had a pleasant odour and good adhesion to glass, aluminium, PVC, sheet metal, steel and wood. Even after the sealant had been stored at 60° C. for 4 weeks, the sealant was stable and colourless.

Thus, curing agents of the invention comprising a mixture of silanes lead to sealants having good properties. More particularly, curing agents of the invention comprising a mixture of silanes lead to a sealant which does not cause any odour nuisance on deployment, has good elongation at break and, even in the course of prolonged storage at elevated temperature, remains stable and does not become discoloured.

Example 9 (Curing Agent Comprising a Mixture of Silanes)

A silicone rubber mixture of the following composition was produced by mixing the components under reduced pressure:

| | |
|---|---|
| 550 g | alpha,omega-dihydroxyl-terminated polydimethylsiloxane having viscosity of 80 000 cSt |
| 268 g | polydimethylsiloxane having viscosity of 100 cSt |
| 40 g | curing agent 1: tris(2-ethylhexylsalicylato)methylsilane |
| 40 g | curing agent 2: tris(2-ethylhexylsalicylato)propylsilane |
| 1 g | aminoalkyltrialkoxysilane |
| 85 g | untreated fumed silica |
| 0.7 g | catalyst: 1:1 (w/w) mixture of dialkyltin oxide and tetraalkoxysilane |
| 16 g | adhesion promoter: 1:3 (w/w) mixture of dialkylaminoalkyltrialkoxysilane and tris(trialkoxysilylalkyl) isocyanurate |

The resulting sealant was transparent and colourless and had a skin time of 16 minutes, a tack-free time of 38 minutes and complete through-curing to glass (sealant applied in thickness of 9 mm to a glass plate) after 7 days. Elongation at break was determined as 310%. In addition, the sealant had a pleasant odour and good adhesion to glass, aluminium, PVC, sheet metal, steel and wood. Even after the sealant had been stored at 60° C. for 4 weeks, the sealant was stable and colourless.

Example 10 (Curing Agent Comprising a Mixture of Silanes)

A silicone rubber mixture of the following composition was produced by mixing the components under reduced pressure:

| | |
|---|---|
| 540 g | alpha,omega-dihydroxyl-terminated polydimethylsiloxane having viscosity of 80 000 cSt |
| 310 g | polydimethylsiloxane having viscosity of 100 cSt |
| 28 g | curing agent 1: methyltris(diethyllactamido)silane |
| 20 g | curing agent 2: vinyltris(diethyllactamido)silane |
| 1 g | aminoalkyltrialkoxysilane |
| 96 g | untreated fumed silica |
| 1.2 g | catalyst: 1:1 (w/w) mixture of dialkyltin oxide and tetraalkoxysilane |
| 10 g | adhesion promoter: dialkylaminoalkyltrialkoxysilane |

The resulting sealant was transparent and colourless and had a skin time of 10 minutes, a tack-free time of 50 minutes and complete through-curing to glass (sealant applied in thickness of 9 mm to a glass plate) after 7 days. In addition, the sealant was odourless and had good adhesion to glass, aluminium, PVC, sheet metal, steel, wood, lacquered wood, varnished wood, polyamide and Al/Mg alloy. Even after the sealant had been stored at 60° C. for 4 weeks, the sealant was stable and colourless.

Thus, curing agents of the invention comprising a mixture of silanes lead to sealants having good properties. More particularly, curing agents of the invention comprising a mixture of silanes lead to a sealant which does not cause any odour nuisance on deployment, has good elongation at break and, even in the course of prolonged storage at elevated temperature, remains stable and does not become discoloured.

Thus, the curing agents of the invention are of good suitability as curing agent in silicone rubber compositions (sealants).

The invention claimed is:

1. A curing agent for silicone rubber compounds, comprising a compound having the general structural formula $R^1_m Si(R)_{4-m}$
where
each $R^1$ is independently an optionally substituted straight-chain or branched C1- to C16-alkyl group, an optionally substituted straight-chain or branched C2- to C16-alkenyl group, or an optionally substituted C4- to C14-aryl group,
m is an integer from 0 to 2,
wherein
(a) R is a hydroxycarboxylic ester radical having the general structural formula (II):

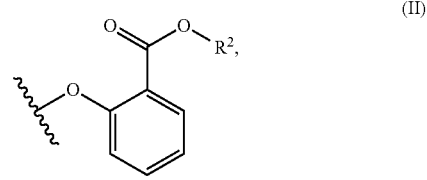

(II)

where $R^2$ is an optionally substituted straight-chain or branched C1- to C16-alkyl group, a C4- to C14-cycloalkyl group, or a C5- to C15-aralkyl group, with the proviso that $R^2$ is not ethyl, benzyl, or phenethyl, or oligomers or polymers of the curing agent,
or
(b) the general structural formula $R^1_m Si(R)_{4-m}$ is

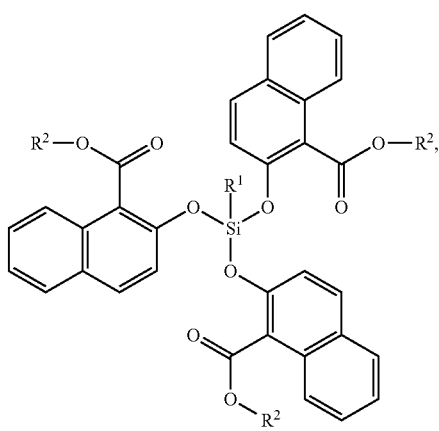

or oligomers or polymers of the curing agent, wherein $R^2$ is an optionally substituted straight-chain or branched C1- to C16-alkyl group, a C4- to C14-cycloalkyl group, a C5- to C15-aralkyl group, or a C4- to C14-aryl group,
or
(c) R is a hydroxycarboxylic ester radical having the general structural formula (I):

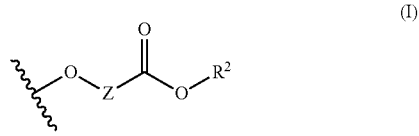

(I)

where
R² is an optionally substituted straight-chain or branched C1- to C16-alkyl group, a C4- to C14-cycloalkyl group, a C5- to C15-aralkyl group, or a C4- to C14-aryl group, with the proviso that R² is not ethyl, benzyl or phenyl, wherein Z is —(CR³R⁴)$_n$— in which n is an integer from 2 to 10, or an optionally substituted saturated or partly unsaturated cyclic ring system having 4 to 14 carbon atoms, each R³ and R⁴ is independently H or an optionally substituted straight-chain or branched C1- to C16 alkyl group or a C4- to C14-aryl group, and n is an integer from 2 to 10, or oligomers or polymers of the curing agent.

2. The curing agent according to claim 1, wherein n is an integer from 2 to 5.

3. The curing agent according to claim 1, wherein each R³ and R⁴ is independently H or an optionally substituted straight-chain or branched C1- to C12-alkyl group.

4. The curing agent according to claim 1, wherein each R³ and R⁴ is independently selected from the group consisting of H, methyl, ethyl, propyl, butyl, n-butyl, sec-butyl, isobutyl and tert-butyl.

5. The curing agent according to claim 1, wherein R is a hydroxycarboxylic ester radical having the general structural formula (I), and wherein R² in general structural formula (I) is an optionally substituted straight-chain or branched C1- to C12-alkyl group, a C4- to C10-cycloalkyl group, a C5- to C11-aralkyl group, or a C4- to C10-aryl group, with the proviso that R² is not ethyl, benzyl or phenyl.

6. The curing agent according to claim 5, wherein R² is selected from the group consisting of methyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, nonyl, decyl, undecyl, dodecyl, ethylhexyl, 2-ethylhexyl, naphthyl and cyclohexyl.

7. The curing agent according to claim 1, wherein R is a hydroxycarboxylic ester radical having the general structural formula (II), and wherein R² in general structural formula (II) is an optionally substituted straight-chain or branched C1- to C12-alkyl group, a C4- to C10-cycloalkyl group or a C5- to C11-aralkyl group, with the proviso that R² is not ethyl, benzyl, or phenethyl.

8. The curing agent according to claim 7, wherein R² is selected from the group consisting of methyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, nonyl, decyl, undecyl, dodecyl, ethylhexyl, 2-ethylhexyl, naphthyl and cyclohexyl.

9. The curing agent according to claim 8, wherein R² is selected from the group consisting of methyl, isopropyl, n-butyl and 2-ethylhexyl.

10. The curing agent according to claim 1, wherein each R¹ is independently an optionally substituted straight-chain or branched C1- to C12-alkyl group, an optionally substituted straight-chain or branched C2- to C12-alkenyl group, or an optionally substituted C4- to C10-aryl group.

11. The curing agent according to claim 10, wherein each R¹ is independently methyl, ethyl, propyl, vinyl, phenyl or allyl.

12. The curing agent according to claim 1, wherein the general structural formula R¹$_m$Si(R)$_{4-m}$ is

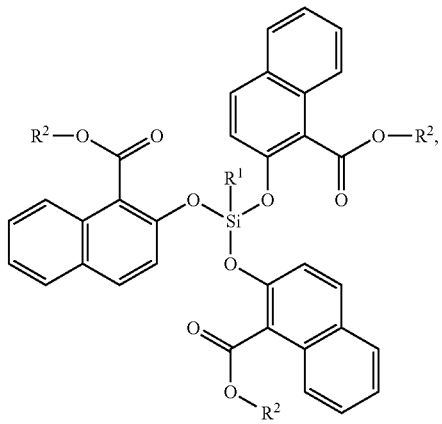

wherein R² is an optionally substituted straight-chain or branched C1- to C12-alkyl group, a C4- to C10-cycloalkyl group, a C5- to C10-aryl group, or a C5- to C11-aralkyl group.

13. The curing agent according to claim 12, wherein R² is selected from the group consisting of methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, nonyl, decyl, undecyl, dodecyl, ethylhexyl, 2-ethylhexyl, benzyl, phenyl, naphthyl and cyclohexyl.

14. The curing agent according to claim 1, wherein the general structural formula R¹$_m$Si(R)$_{4-m}$ is

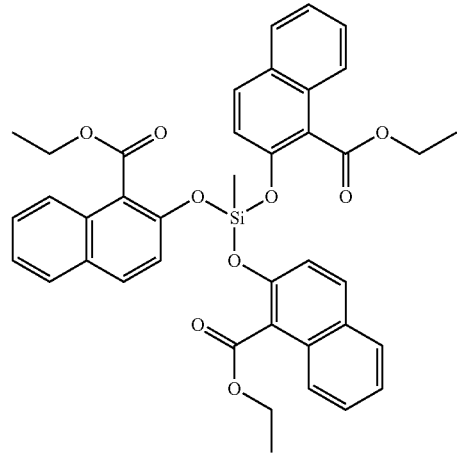

or oligomers or polymers of the curing agent.

15. A curing agent for silicone rubber compounds, comprising at least one compound selected from the group of consisting of tris(2-ethylhexylsalicylato)ethyl silane, tris(2-ethylhexylsalicylato)methyl silane, tris(2-ethylhexylsalicylato)phenyl silane, tris(2-ethylhexylsalicylato)propyl silane, tris(2-ethylhexyl-salicylato)vinyl silane, tris(ethylhexylsalicylato)ethyl silane, tris(ethylhexylsalicylato)methyl-silane, tris(ethylhexylsalicylato)phenyl silane, tris(ethylhexylsalicylato)propyl silane, tris-(ethylhexylsalicylato)vinyl silane, tris(isopropylsalicylato)ethyl silane, tris(isopropylsalicylato)-phenyl silane, tris(isopropylsalicylato)propyl silane, tris(isopropylsalicylato)vinyl silane, tris-(methylsalicylato) ethyl silane, tris(methylsalicylato)methyl silane, tris(methylsalicylato)phenyl-silane, tris(methylsalicylato)vinyl silane, tetra(2-ethylhexylsalicylato)silane, tetra(ethylhexylsalicylato)silane, tetra(isopropylsalicylato) silane, and tetra (methylsalicylato)silane, or oligomers or polymers of the curing agent, or mixtures thereof.

16. A curing agent for silicone rubber compounds, comprising a compound having the structural formula:

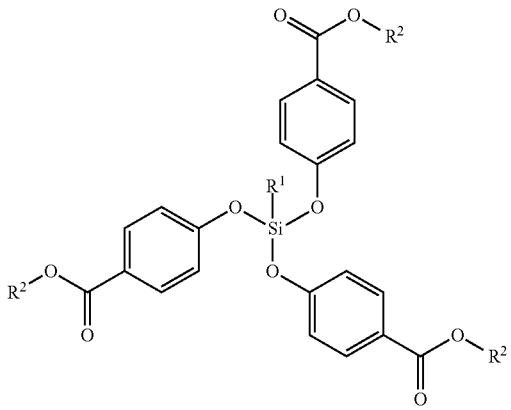

where $R^1$ is vinyl and $R^2$ is ethylhexyl,
or oligomers or polymers of the curing agent.

17. The curing agent according to claim 1, comprising at least two different compounds from said general structural formula $R^1_m Si(R)_{4-m}$.

18. The curing agent of claim 1, obtainable by mixing together at least two different compounds from said general structural formula $R^1_m Si(R)_{4-m}$.

19. A process for preparing the curing agent according to claim 1, comprising reacting a compound having the general formula $R^1_m SiX_{4-m}$ with (4−m) equivalents of at least one hydroxycarboxylic ester,
where
 each $R^1$ is independently an optionally substituted straight-chain or branched C1- to C16-alkyl group, an optionally substituted straight-chain or branched C2- to C16-alkenyl group, or an optionally substituted C4- to C14-aryl group,
 m is an integer from 0 to 2,
 X is selected from the group consisting of an alkoxy radical having at least one carbon atom, and a halogen atom,
and wherein said at least one hydroxycarboxylic ester is selected from the group consisting of:
 (a) a hydroxycarboxylic ester having the general structural formula (II):

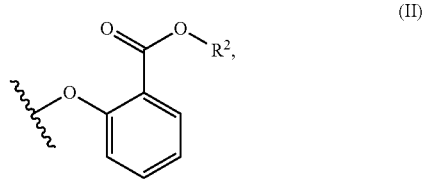

where $R^2$ is an optionally substituted straight-chain or branched C1- to C16-alkyl group, a C4- to C14-cycloalkyl group, or a C5- to C15-aralkyl group, with the proviso that $R^2$ is not ethyl, benzyl, or phenethyl, or oligomers or polymers of the curing agent,
or
 (b) a hydroxycarboxylic ester that reacts with said compound having the general formula $R^1_m SiX_{4-m}$ to generate a compound of the following formula

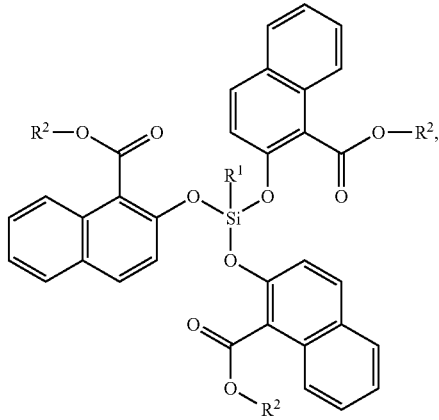

wherein $R^2$ is an optionally substituted straight-chain or branched C1- to C16-alkyl group, a C4- to C14-cycloalkyl group, a C5- to C15-aralkyl group, or a C4- to C14-aryl group,
or
 (c) a hydroxycarboxylic ester having the general structural formula (III)

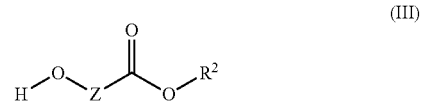

where
$R^2$ is an optionally substituted straight-chain or branched C1- to C16-alkyl group, a C4- to C14-cycloalkyl group, a C5- to C15-aralkyl group, or a C4- to C14-aryl group, with the proviso that $R^2$ is not ethyl, benzyl or phenyl,
wherein
Z is $-(CR^3R^4)_n-$ in which n is an integer from 2 to 10, or a saturated or partly unsaturated cyclic ring system having 4 to 14 carbon atoms,
each $R^3$ and $R^4$ is independently H or an optionally substituted straight-chain or branched C1- to C16-alkyl group or a C4- to C14-aryl group, and
n is an integer from 2 to 10.

20. The process according to claim 19, wherein each $R^1$ is independently an optionally substituted straight-chain or branched C1- to C12-alkyl group, or an optionally substituted straight-chain or branched C2- to C12-alkenyl group, or an optionally substituted C4- to C10-aryl group.

21. The process according to claim 19, wherein each $R^3$ and $R^4$ is independently H or an optionally substituted straight-chain or branched C1- to C12-alkyl group.

22. The process according to claim 19, wherein $R^2$ is an optionally substituted straight-chain or branched C1- to C12-alkyl group, a C4- to C10-cyclohexyl group, a C5- to C11-aralkyl group, or a C4- to C10-aryl group, with the proviso that $R^2$ is not ethyl, benzyl or phenyl.

23. The process according to claim 19, wherein each $R^1$ is independently methyl, ethyl, propyl, vinyl, phenyl or allyl and/or the hydroxycarboxylic ester is characterized by one or more of the following features: $R^2$ is an optionally substituted straight-chain or branched C1- to C8-alkyl group, a C4- to C10-cycloalkyl group, or a C4- to C10-aryl group, with the proviso that $R^2$ is not ethyl or phenyl; and $R^3$ and $R^4$ is independently H or an optionally substituted straight-chain or branched C1- to C12-alkyl group.

24. The curing agent according to claim 1, wherein R is a hydroxycarboxylic ester radical having the general structural formula (II).

25. A method for hardening a silicone rubber compound, said method comprising mixing a silicone rubber compound with the curing agent according to claim 1.

26. A composition comprising a curing agent according to claim 1, and an organosilicon compound.

27. The composition according to claim 26, wherein the organosilicon compound is an alpha,omega-dihydroxyl-terminated polyorganosiloxane compound.

28. A composition obtainable by mixing at least one curing agent of claim 1 with at least one bonding agent (adhesion promoter) and at least one further component selected from the group consisting of thixotropic agent, organosilicon compound, filler, colorant, plasticizer, wetting agent and catalyst.

29. The composition according to claim 24, wherein said composition is suitable as a sealant, adhesive, potting compound and/or a coating composition.

30. A method for curing a silicone rubber compound, wherein said method comprises mixing a silicone rubber compound with a curing agent comprising a compound having the general structural formula $R^1{}_m Si(R)_{4-m}$
where
each $R^1$ is independently an optionally substituted straight-chain or branched C1- to C16-alkyl group, an optionally substituted straight-chain or branched C2- to C16-alkenyl group, or an optionally substituted C4- to C14-aryl group,
m is an integer from 0 to 2,
R is a hydroxycarboxylic ester radical having the general structural formula (I):

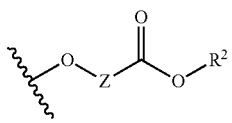

(I)

where
$R^2$ is an optionally substituted straight-chain or branched C1- to C16-alkyl group, a C4- to C14-cycloalkyl group, a C5- to C15-aralkyl group, or a C4- to C14-aryl group, wherein
Z is
(A) an optionally substituted aromatic group having 4 to 14 carbon atoms, where, when m=2, m=1 or m=0, the C6-aryl group is not

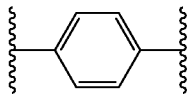

and, when m=2 or m=0 and the C6-aryl group is

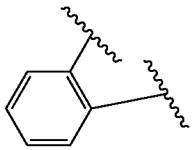 [SMILES: *c1ccccc1*]

$R^2$ is not phenyl;
and, when the C6-aryl group is

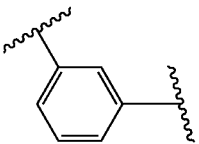 [SMILES: *c1cccc(*)c1]

$R^2$ is not ethyl or H
(B) —$(CR^3R^4)_n$—, wherein n is an integer from 2 to 10 or
(C) an optionally substituted saturated or partly unsaturated cyclic ring system having 4 to 14 carbon atoms,
each $R^3$ and $R^4$ is independently H or an optionally substituted straight-chain or branched C1- to C16 alkyl group or a C4- to C14-aryl group, and
n is an integer from 2 to 10,
or oligomers or polymers of the curing agent.

31. The method according to claim 30, wherein said curing agent comprises a compound selected from the group of consisting of tris(2-ethylhexyl-salicylato)ethylsilane, tris (2-ethylhexylsalicylato)methylsilane, tris(2-ethylhexylsalicylato)-phenyl silane, tris(2-ethylhexylsalicylato)propylsilane, tris(2-ethylhexylsalicylato)vinylsilane, tris(ethylhexylsalicylato)ethylsilane, tris(ethylhexylsalicylato)methyl silane, tris(ethylhexyl-salicylato)phenylsilane, tris(ethylhexylsalicylato)propylsilane, tris(ethylhexylsalicylato)vinyl-silane, tris(ethylsalicylato)ethylsilane, tris(ethylsalicylato)methylsilane, tris(ethylsalicylato)-phenyl silane, tris(ethylsalicylato)propylsilane, tris(ethylsalicylato)vinyl silane, tris(isopropyl-salicylato)ethylsilane, tris(isopropylsalicylato)phenylsilane, tris(isopropylsalicylato)propylsilane, tris(isopropylsalicylato)vinylsilane, tris(methylsalicylato)ethyl silane, tris(methylsalicylato)-methyl silane, tris(methylsalicylato)phenylsilane, tris(methylsalicylato)vinylsilane, tetra(2-ethylhexylsalicylato)silane, tetra(ethylhexylsalicylato)silane, tetra(ethylsalicylato)silane, tetra(isopropylsalicylato) silane, and tetra(methylsalicylato)silane, or oligomers or polymers of the curing agent,
or mixtures thereof.